United States Patent
Jin et al.

(10) Patent No.: US 8,154,794 B2
(45) Date of Patent: Apr. 10, 2012

(54) IMAGING LENS AND METHOD OF MANUFACTURING THE SAME

(75) Inventors: Young Su Jin, Gyunggi-do (KR); In Cheol Chang, Gyunggi-do (KR); Cheong Hee Lee, Gyunggi-do (KR); Jung Eun Noh, Gyunggi-do (KR); Dong Ik Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 564 days.

(21) Appl. No.: 12/081,860

(22) Filed: Apr. 22, 2008

(65) Prior Publication Data

US 2008/0273239 A1 Nov. 6, 2008

(30) Foreign Application Priority Data

Apr. 23, 2007 (KR) .................. 10-2007-0039391

(51) Int. Cl.
 G02B 13/14 (2006.01)
(52) U.S. Cl. .................. 359/355; 359/722; 359/900
(58) Field of Classification Search .................. 359/355, 359/581, 585, 589, 619, 621, 622, 623, 708, 359/717, 718, 722, 738, 740, 742, 900, 359, 359/361, 601; 396/113; 264/1.1, 2.5, 2.7
See application file for complete search history.

(56) References Cited

U.S. PATENT DOCUMENTS

| | | | | |
|---|---|---|---|---|
| 5,079,130 A * | 1/1992 | Derkits, Jr. | ..................... | 430/321 |
| 5,225,244 A * | 7/1993 | Aharoni et al. | ............... | 427/240 |
| 5,923,020 A * | 7/1999 | Kurokawa et al. | ............ | 235/454 |
| 6,989,932 B2 * | 1/2006 | Cho et al. | ....................... | 359/619 |
| 7,042,645 B2 * | 5/2006 | Houlihan et al. | ............. | 359/619 |
| 7,187,501 B2 * | 3/2007 | Wakisaka | ...................... | 359/622 |
| 7,329,856 B2 * | 2/2008 | Ma et al. | ....................... | 250/226 |
| 7,502,169 B2 * | 3/2009 | Wood | ............................. | 359/619 |
| 7,901,736 B2 * | 3/2011 | Maula et al. | ............... | 427/248.1 |
| 7,903,338 B1 * | 3/2011 | Wach | ............................ | 359/588 |
| 7,929,220 B2 * | 4/2011 | Sayag | ........................... | 359/738 |
| 7,941,572 B2 * | 5/2011 | Norman | ......................... | 710/20 |
| 8,000,041 B1 * | 8/2011 | Lin et al. | ....................... | 359/811 |
| 8,027,093 B2 * | 9/2011 | Commander et al. | ........ | 359/619 |

(Continued)

FOREIGN PATENT DOCUMENTS

EP 1 542 074 A1 6/2005

(Continued)

OTHER PUBLICATIONS

Office Action mailed on Apr. 21, 2008 and issued in corresponding Korean Patent Application No. 10-2007-0039391.

*Primary Examiner* — Frank Font

(57) ABSTRACT

There is provided an imaging lens including: a transparent substrate; an upper lens disposed on a top of the transparent substrate; and a lower lens disposed on a bottom of the transparent substrate to correspond to the upper lens, wherein one of the upper and lower lenses includes a lens element and a partition wall formed higher than the lens element to surround the lens element. Also, there is provided a method of manufacturing the same. In the imaging lens, the partition wall is replicated together with the lens element on one or both surfaces of the transparent substrate. The partition wall is formed higher than the lens element and has a flat top surface. Therefore, when another lens element is replicated on an opposite surface of the transparent substrate, the previously replicated lens element is prevented from deformation.

17 Claims, 14 Drawing Sheets

U.S. PATENT DOCUMENTS

| | | | | |
|---|---|---|---|---|
| 8,031,407 B2* | 10/2011 | Hurwitz et al. | ............... | 359/642 |
| 8,049,193 B1* | 11/2011 | Appleby et al. | ........... | 250/505.1 |
| 8,058,737 B2* | 11/2011 | Hasegawa et al. | ............ | 257/797 |
| 2003/0115907 A1* | 6/2003 | Patton et al. | .................... | 65/106 |
| 2005/0128597 A1* | 6/2005 | Amanai | ..................... | 359/621 |
| 2006/0109568 A1* | 5/2006 | Chen | .......................... | 359/708 |
| 2006/0176583 A1* | 8/2006 | Jin et al. | ...................... | 359/811 |
| 2006/0204243 A1* | 9/2006 | Tsai | ............................. | 396/529 |
| 2007/0285555 A1* | 12/2007 | Chen | .......................... | 348/340 |
| 2008/0054507 A1* | 3/2008 | Rudmann et al. | ............. | 264/2.7 |
| 2008/0100910 A1* | 5/2008 | Kim et al. | .................... | 359/356 |
| 2008/0230934 A1* | 9/2008 | Rudmann et al. | ............. | 264/2.7 |
| 2009/0015932 A1* | 1/2009 | Chien | ......................... | 359/642 |
| 2009/0068798 A1* | 3/2009 | Oliver et al. | ................. | 438/127 |
| 2009/0174947 A1* | 7/2009 | Hasegawa | .................... | 359/642 |
| 2009/0206431 A1* | 8/2009 | Bolken et al. | ................ | 257/432 |

FOREIGN PATENT DOCUMENTS

| | | | |
|---|---|---|---|
| JP | 05000423 A | * | 1/1993 |
| JP | 9-197239 | | 7/1997 |
| JP | 2000-301550 | | 10/2000 |
| JP | 2002-355826 | * | 12/2002 |
| KR | 10-2006-0070813 | | 6/2006 |

* cited by examiner

IMAGING LENS AND METHOD OF MANUFACTURING THE SAME

CROSS-REFERENCE TO RELATED APPLICATIONS

This application claims the priority of Korean Patent Application No. 2007-0039391 filed on Apr. 23, 2007, in the Korean Intellectual Property Office, the disclosure of which is incorporated herein by reference.

BACKGROUND OF THE INVENTION

1. Field of the Invention

The present invention relates to an imaging lens and a method of manufacturing the same, and more particularly, to an imaging lens manufactured by eliminating a problem of a dicing process and preventing a lens element from deformation, and a method of manufacturing the same.

2. Description of the Related Art

Increasingly smaller pixels of an image sensor for recent use have also led to a smaller size of an optical device installed in an optical apparatus utilizing such an image sensor. The smaller size of the optical device renders it very difficult to assemble the optical apparatus. To overcome this problem, the optical device has been manufactured by a replication method such as hot embossing or ultraviolet (UV) embossing which ensures wafer-scale mass production.

A replica method is a known art for manufacturing a data storage device such as a compact disc (CD) and a digital versatile disc (DVD), or a micro lens. Usually, glass or plastic is utilized as a substrate to have various replication layers formed thereon.

Conventionally, to ensure optical properties of a lens, the lens elements are replicated on one surface of the substrate and then the plurality of substrates are deposited.

However, this conventional configuration where the plurality of substrates are deposited disadvantageously increases height of the lens elements.

To overcome this problem, as shown in FIG. 1, the lens elements are formed by the replica method on both surfaces of the substrate 200. However, when a replication layer 210 is formed on one surface and another replication layer 220 is formed on an opposite surface, the lens elements may be impaired due to the replication process.

Moreover, after the replication process, when the substrate is diced into individual lens units along a line 300, a dicing tape (not shown) needs to be bonded onto the substrate. This requires the lens element on one of the surfaces of the substrate to have negative refractive power or an additional structure for dicing to be installed on the substrate where the replication layers are formed.

SUMMARY OF THE INVENTION

An aspect of the present invention provides a method of manufacturing an imaging lens in which a dicing tape is easily adhered to overcome a problem of a dicing process, thereby preventing lens elements from deformation during replication process.

Another aspect of the present invention provides an imaging lens manufactured to prevent lens elements from deformation during replication process.

According to an aspect of the present invention, there is provided an imaging lens including: a transparent substrate; an upper lens disposed on a top of the transparent substrate; and a lower lens disposed on a bottom of the transparent substrate to correspond to the upper lens, wherein one of the upper and lower lenses includes a lens element and a partition wall formed higher than the lens element to surround the lens element.

The transparent substrate may include an infra-red blocking layer. The transparent substrate may include a stop.

The upper lens may include an anti-reflective coating layer formed of one of a metallic material and an amorphous carbon-based organic anti-reflective coating material, wherein the metallic material is one selected from a group consisting of Ti, TiN, MoSi, SiNO, SiC, $MoO_3$, $Si_3N_4$, AlGaAs, GaAs, CdSe and Inp.

The lens element may be formed of an aspherical lens having one of positive and negative refractive powers. The lens element may be formed of a diffractive lens having one of positive and negative refractive powers.

According to another aspect of the present invention, there is provided a method of manufacturing an imaging lens, the method including: forming a plurality of upper lenses on a transparent substrate, the upper lenses each having an upper lens element and an upper partition wall formed higher than the upper lens element to surround the upper lens element; replicating a plurality of lower lenses on a bottom of the transparent substrate to correspond to the upper lenses; and dicing the transparent substrate along a trimming line passing through the upper partition wall.

The forming a plurality of upper lenses on a transparent substrate may include: forming a stamp on a first substrate to replicate the plurality of upper lenses, and forming the plurality of upper lenses on the transparent substrate using the stamp.

In the replicating a plurality of lower lenses, the lower lenses each may include a lower partition wall corresponding to the upper partition wall of each of the upper lenses.

The dicing the transparent substrate may include: adhering a dicing tape on one of the upper and lower partition walls.

The forming a plurality of upper lenses on a transparent substrate may include forming an anti-reflective coating layer formed of one of a metallic material and an amorphous carbon-based organic anti-reflective coating material, wherein the metallic material is one selected from a group consisting of Ti, TiN, MoSi, SiNO, SiC, $MoO_3$, $Si_3N_4$, AlGaAs, GaAs, CdSe and Inp.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

FIG. 2A to FIG. 2E are cross-sectional views illustrating a method of manufacturing an imaging lens according to an exemplary embodiment of the invention. FIG. 3 is a cross-sectional view illustrating an imaging lens obtained by a method of manufacturing an imaging lens according to an exemplary embodiment of the invention. Regarding the method of manufacturing the imaging lens according to the present embodiment, a description will be given of a dicing process for which a partition wall is formed to surround each of lens elements. In the following description, well-known functions and constructions are not described in detail since they would obscure the intention in unnecessary detail.

Figure 1:
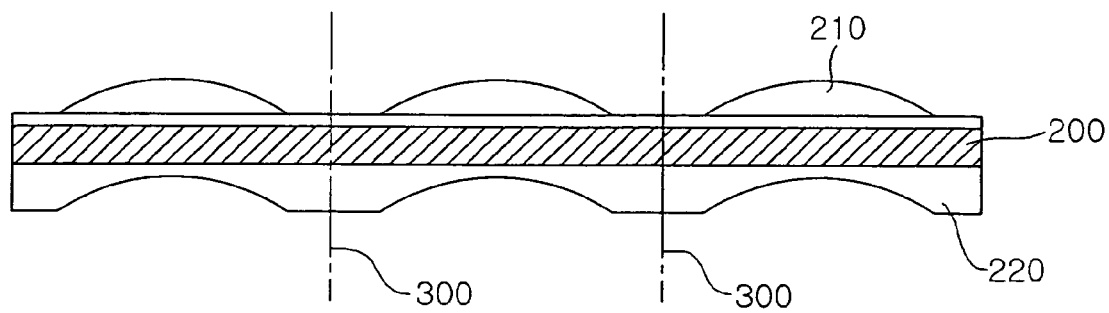
FIG. 1 is an exemplary view for explaining a conventional process of dicing a replica lens.
Figure 2A:
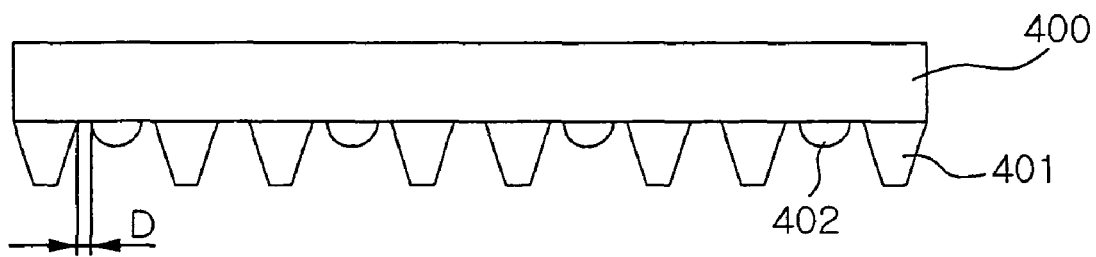
FIG. 2A to FIG. 2E are cross-sectional views illustrating a method of manufacturing an imaging lens according to an exemplary embodiment of the invention.
Figure 3:
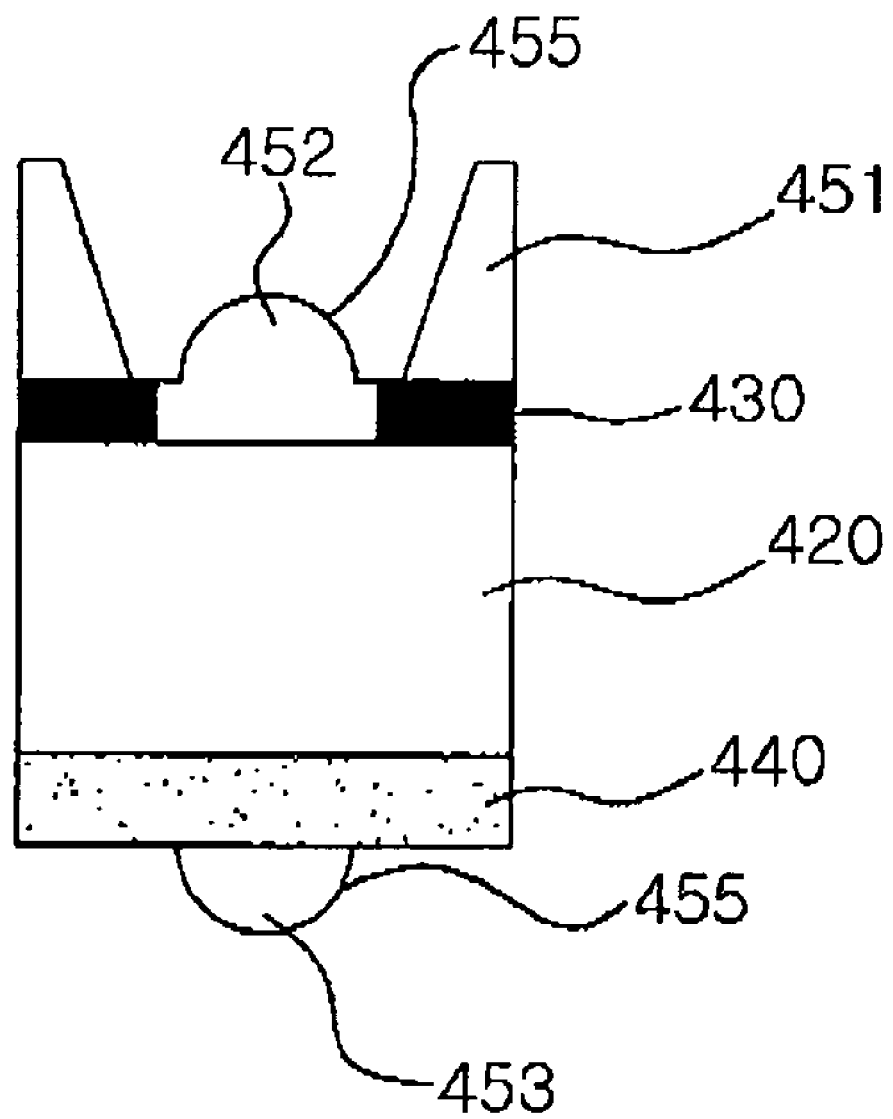
FIG. 3 is a cross-sectional view illustrating an imaging lens obtained by a method of manufacturing an imaging lens according to an exemplary embodiment of the invention.

As shown in FIG. 2A, in manufacturing the imaging lens according to the present embodiment, a master is formed by bonding a plurality of master molds on one surface, e.g., a bottom of a base 400. Each of the master molds includes a lens mold 402 formed in an identical shape to the imaging lens to replicate the imaging lens, and a partition wall mold 401.

The partition wall mold 401 of the master mold is protruded at a height greater than a height of the lens mold 402 to surround the lens mold 402. Also, the partition wall mold 401 has a flat top surface. The partition wall mold 401 may be formed at a distance of "D" from the lens mold 402 according to size of a desired final imaging lens. Here, the lens mold 402 of the master mold is of a hemispherical convex shape but not limited thereto. The lens mold 402 may be formed of a concave lens, an aspherical lens having positive or, negative refractive power or a diffractive lens.

Figure 2B:
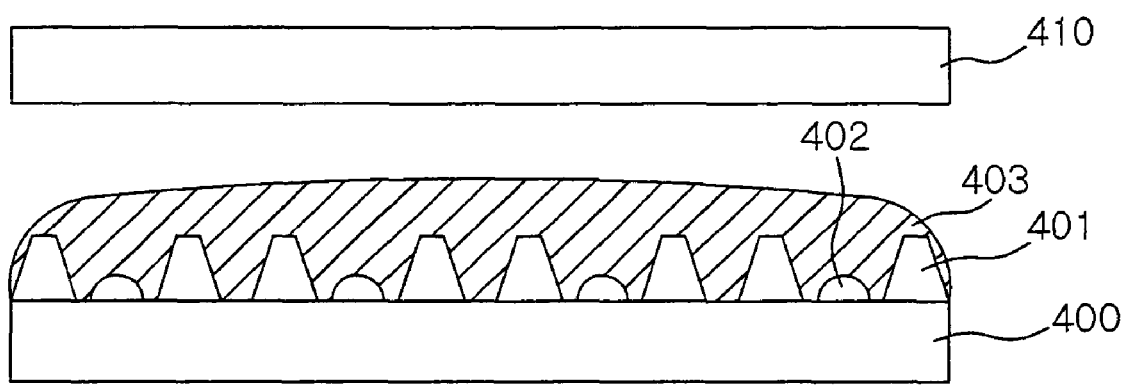

Thereafter, as shown in FIG. 2B, the master including the plurality of master molds with the partition wall molds 401 are turned upside down, and a polymer 403 is applied to cover the master mold including the partition wall mold 401. The polymer 403 may utilize ultra-violet (UV)-curable polymer, photopolymer epoxy, polycarbonate, polydimethylsiloxane (PDMS), polymethyl methacrylate (PMMA) resin.

After the polymer 403 is applied to cover the master mold having the partition wall mold 401, the polymer 403 is compressed from above by a first substrate 410. Then, the polymer 403 is cured to be bonded to a bottom of the first substrate 410. Here, according to type of the polymer used, the polymer 403 may be cured by UV embossing where UV is irradiated or hot embossing where heat is applied.

Particularly, in a case where the first substrate 410 shown in FIG. 2B is a transparent substrate, the first substrate 410 is formed of glass, fused silica, quartz, polydimethylsiloxane (PDMS), polymethyl methacrylate (PMMA) or polyethylene terephthalate (PET). Then, the polymer 403 is cured by UV embossing.

Figure 2C:
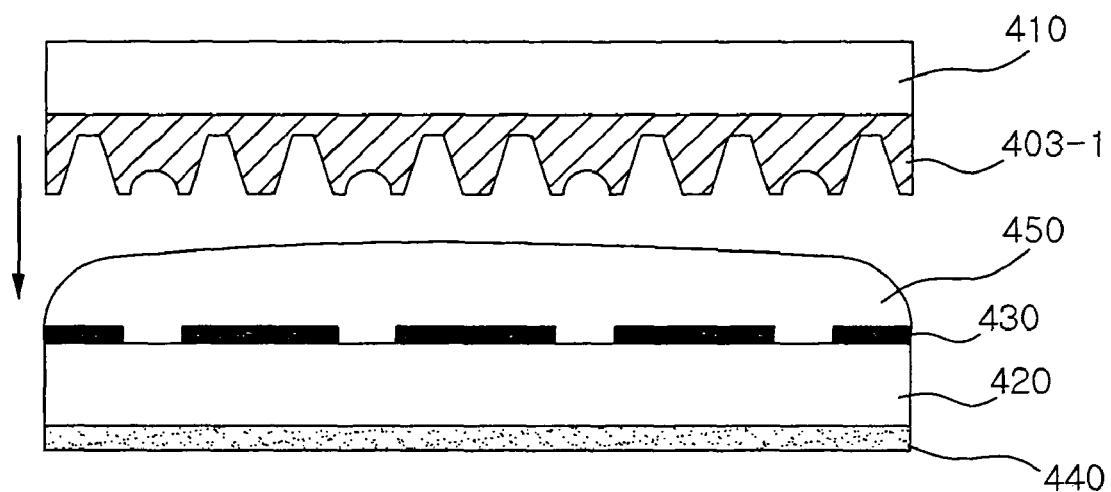

After the polymer 403 is cured, the master including the partition wall mold 401 and the lens mold 402 is removed, thereby allowing a stamp mold 403-1 made of the polymer 403 to be formed on the bottom of the first substrate 410, as shown in FIG. 2C.

Meanwhile, a metal film or a photosensitive polymer film made of e.g. Al or Cr may be applied on a transparent substrate 420 to form a stop 430. Also, an infra-red (IR) filter 440 may be formed on a bottom of the transparent substrate 420.

Particularly, in a case where the stop 430 is formed of the metal film made of e.g., Al or Cr, the stop 430 is less bonded to a lens transparent polymer 450 applied thereon due to high hydrophobic characteristics of the metal film. This requires an additional layer to be formed on the metal film.

Meanwhile, in a case where the stop 430 is formed of the photosensitive polymer, the stop 430 is superbly bonded to the lens transparent polymer 450 due to high hydrophilic characteristics of the photosensitive polymer. This advantageously precludes a need for forming a bonding layer additionally on the photosensitive resin layer.

Furthermore, in a case where the stop 430 is formed of the metal film, other sequential processes such as exposure, and deposition and removal of the metal film should follow. Meanwhile, in a case where the stop 430 is formed of the photosensitive polymer, the stop 430 can be formed only by exposure due to characteristics of the photosensitive polymer, thereby reducing manufacturing costs and time.

Meanwhile, the metal film made of e.g., Al or Cr has high reflectivity and thus light passed through the stop 430 is reflected again on the transparent substrate 420 or other lens elements, thereby deteriorating image quality. On the other hand, the photosensitive resin film having a high light absorption rate in a visible light region, when adopted, can prevent degrade in image quality resulting from such internal total reflection. Here, the photosensitive polymer for the stop 430 may have a light absorption rate of at least 90% in a visible light region.

Figure 2D:
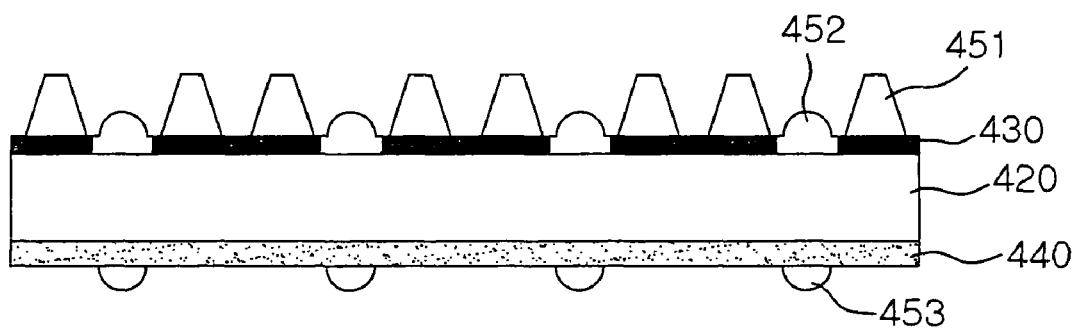

As described above, the transparent substrate 420 has the stop 430 formed on the top thereof and the IR blocking filter 440 formed on the bottom thereof. Thereafter, as shown in FIG. 2C, the lens transparent polymer 450 is applied on the transparent substrate 420 having the stop 430 thereon. After the lens transparent polymer 450 is applied on the transparent substrate 420, the lens transparent polymer 450 is compressed from above by the first substrate 410 having the stamp mold 403-1 thereon, and then cured. Here, when the lens transparent polymer 450 on the transparent substrate 420 is compressed by the stamp mold 403-1 of the first substrate 410, optionally, a release agent may be sufficiently applied on an inner surface of the stamp mold 403-1 to prevent the stamp mold 403-1 from directly contacting the lens transparent polymer 450. This allows the stamp mold 403-1 from being easily separated from the lens transparent polymer 450. Therefore, when the lens transparent polymer 450 is compressed and cured by virtue of the stamp mold 403-1 and separated from each other, as shown in FIG. 2D, upper lenses can be replicated on the transparent substrate 420 according to an inner shape of the stamp mold 403-1. Each of the upper lenses includes an upper lens element 452 and an upper partition wall 451 formed higher than the lens element 452 to surround the upper lens element 452 and having a flat top surface.

Subsequently, other lens transparent polymer is applied on a bottom of the IR blocking filter 440, and then compressed by another stamp mold (not shown) similar to the stamp mold 403-1, cured and separated. This allows lower lens elements 453 to be formed in correspondence with the lens elements 452 of the upper lenses as shown in FIG. 2D.

When the lower lens elements 453 are formed to correspond to the upper lens elements 452, the upper partition wall 451 of the upper lens can prevent the upper lens element 452 from being impaired during the compression process.

Moreover, as shown in FIG. 3, one of the lower lens element 453 and the upper lens element 452 may include an anti-reflective coating layer 455. The anti-reflective coating layer may be formed of one of a metallic material and an amorphous carbon-based organic anti-reflective coating material. Here, the metallic material is one selected from a group consisting of Ti, TiN, MoSi, SiNO, SiC, MoO3, Si3N4, AlGaAs, GaAs, CdSe and InP.

As described above, the transparent substrate 420 has the upper partition wall 451 formed on the top thereof and the lower lens element 453 formed on the bottom thereof. Thereafter, as shown in FIG. 2E, a dicing tape 460 may be adhered to the upper partition wall 451.

Figure 2E:
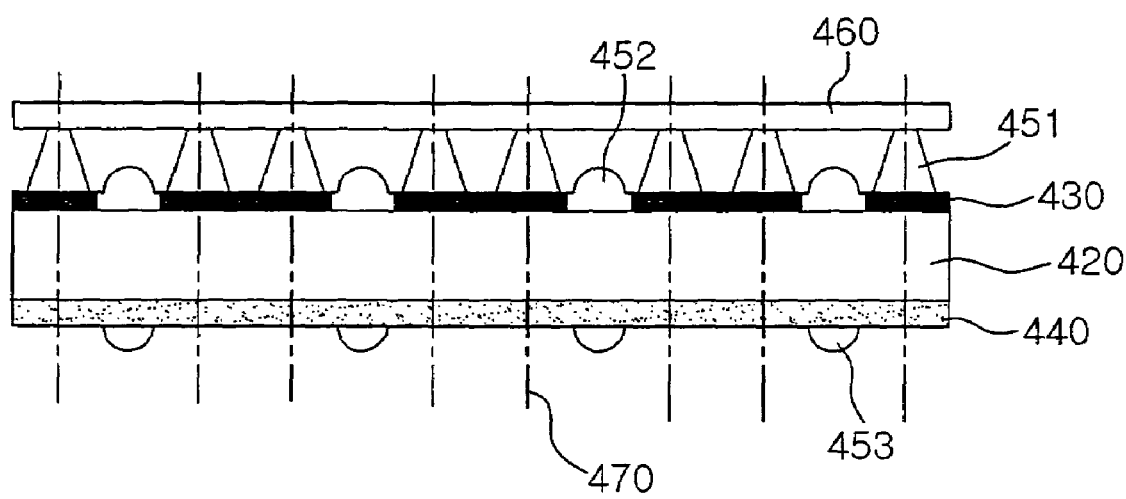

As shown in FIG. 2E, the upper partition wall 451 of the upper lens is formed higher than the upper lens element 452 and has a flat top surface, thereby ensuring the dicing tape 460 for the dicing process to be easily adhered to the upper partition wall 451.

Afterwards, with the dicing tape 460 adhered to the upper partition wall 451, as shown in FIG. 2E, to separate the upper lens elements 452 and the lower lens elements 453 integrally with each other, the transparent substrate 420 is diced along a trimming line 470 passing through the upper partition wall 451.

Here, when the dicing process is performed along the trimming line 470, to prevent the upper lens elements 452 from being damaged by a blade used, the top surface of the upper partition wall 451 should have a width greater than a width of the blade.

Therefore, with the dicing performed along the trimming line 470, as shown in FIG. 3, an imaging lens is produced. The imaging lens includes the stop 430, the upper partition wall 451 and the upper lens element 452 formed on the top of the transparent substrate 420, and the IR blocking filter 440 and the lower lens element 453 formed on the bottom of the transparent substrate 420.

Hereinafter, a description will be given of a method of manufacturing an imaging lens according to another exemplary embodiment of the invention.

FIGS. 4A to 4E are cross-sectional views illustrating a method of manufacturing an imaging lens according to another exemplary embodiment of the present invention. FIG. 5 is a cross-sectional view illustrating an imaging lens obtained by a method of manufacturing an imaging lens according to another exemplary embodiment of the invention.

Figure 4A:
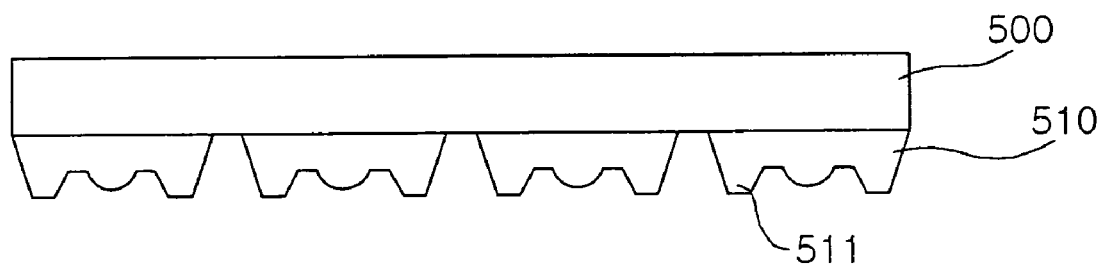
FIG. 4A to FIG. 4F are cross-sectional views illustrating a method of manufacturing an imaging lens according to another exemplary embodiment of the invention.
Figure 5:
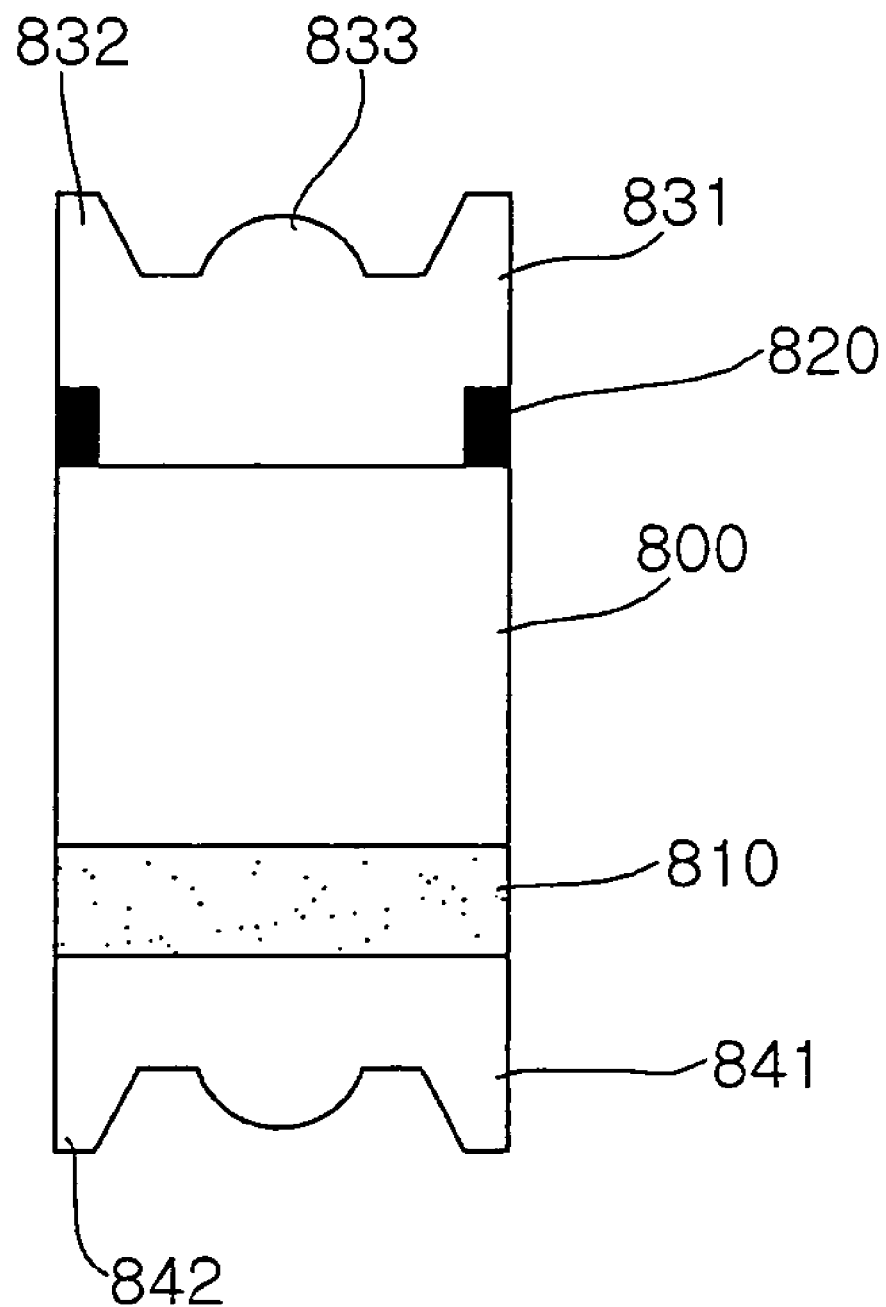
FIG. 5 is a cross-sectional view illustrating an imaging lens obtained by a method of manufacturing an imaging lens according to another exemplary embodiment of the invention.

First, as shown in FIG. 4A, in manufacturing the imaging lens according to the present embodiment, a master is formed by bonding a plurality of master molds 510 on one surface, e.g., a bottom of base 500 to replicate the imaging lens.

Each of the master molds 510 includes a partition wall 511 formed in an identical shape to a lens element which is to be formed later. The partition wall 511 is protruded at a height greater than a height of the lens element to surround the lens element and has a flat top surface. Here, the master mold 510 is of a hemispherical convex shape but not limited thereto. The master mold 510 may be formed of a concave lens, an aspherical lens having positive or negative refractive power or a diffractive lens.

Figure 4B:
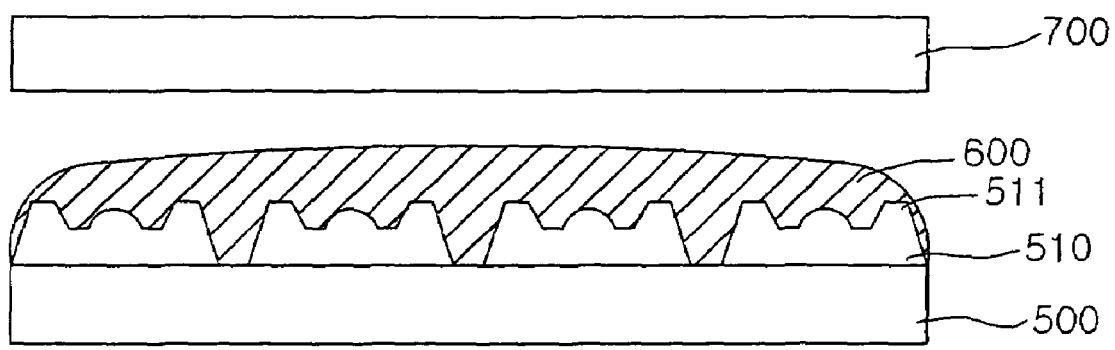

Thereafter, as shown in FIG. 4B, the master including the plurality of master molds 510 with the partition walls 511 are turned upside down, and a polymer 600 is applied to cover the master mold 510 including the partition wall 511. The polymer 600 may utilize ultra-violet (UV)-curable polymer, photopolymer epoxy, polycarbonate, polydimethylsiloxane (PDMS), polymethyl methacrylate (PMMA) resin.

After the polymer 600 is applied to cover the master mold 510 having the partition wall 511, the polymer 600 is compressed from above by a first substrate 700. Then, the polymer 600 is bonded to a bottom of the first substrate 700 and UV is irradiated onto the polymer 600 from above the first substrate 700 to cure the polymer 600 by UV embossing. Of course, according to type of the polymer used, the polymer 600 may be cured by UV embossing where UV is irradiated or hot embossing where heat is applied.

The first substrate 700 shown in FIG. 4B may be a transparent substrate formed of glass, fused silica, quartz, polydimethylsiloxane (PDMS), polymethymethacrylate (PMMA) or polyethylene terephthalate (PET). In a case where the first substrate 700 is such a transparent substrate, the polymer 600 can be cured by UV embossing.

Figure 4C:
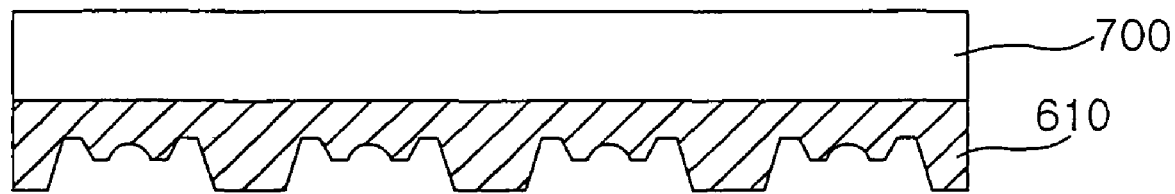

After the polymer 600 is cured, the master including the partition wall 511 is separated, thereby allowing a stamp mold 610 made of the polymer 600 to be formed on the bottom of the first substrate 700, as shown in FIG. 4C. Meanwhile, a metal film or a photosensitive polymer film made of e.g. Al or Cr may be applied on a transparent substrate 800 to form a stop 820. Also, an infra-red (IR) filter 810 is provided on a bottom of the transparent substrate 800.

Particularly, in a case where the stop 820 is formed of the metal film made of e.g., Al or Cr, the stop 820 is less bonded to a lens transparent polymer 830 applied thereon due to high hydrophobic characteristics of the metal film. This requires an additional layer to be formed on the metal film.

Meanwhile, in a case where the stop 820 is formed of the photosensitive polymer, the stop 820 is superbly bonded to the lens transparent polymer 830 due to high hydrophilic characteristics of the photosensitive polymer. This advantageously precludes a need for forming a bonding layer additionally on the photosensitive resin layer.

Furthermore, in a case where the stop 820 is formed of the metal film, other sequential processes such as exposure, and deposition and removal of the metal film should follow. On the other hand, in a case where the stop 820 is formed of the photosensitive polymer, the stop 820 can be formed only by exposure due to characteristics of the photosensitive polymer, thereby reducing manufacturing costs and time.

Meanwhile, the metal film made of e.g., Al or Cr has high reflectivity and thus light passed through the stop 820 is reflected again on the transparent substrate 800 or other lens elements, thereby deteriorating image quality. On the other hand, the photosensitive resin film having a high light absorption rate in a visible light region, when adopted, can prevent degrade in image quality resulting from such internal total reflection. Here, the photosensitive polymer for the stop 820 may have a light absorption rate of at least 90% in a visible light region.

Figure 4D:
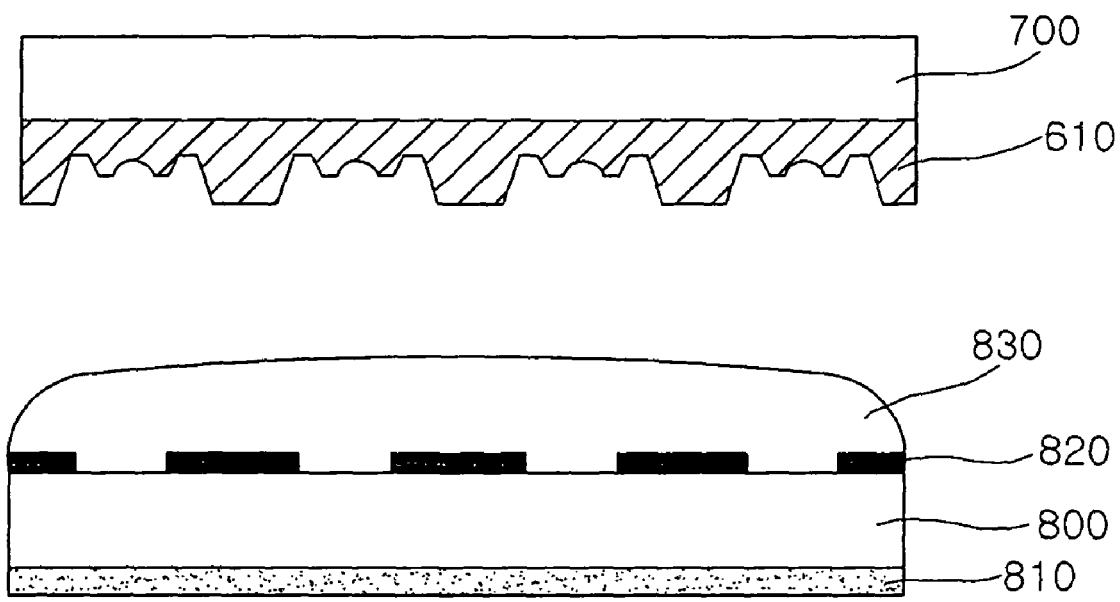

As described above, the transparent substrate has the stop 820 formed on the top thereof and the IR blocking filter 810 formed on the bottom thereof. Thereafter, as shown in FIG. 4D, the lens transparent polymer 830 is applied on the transparent substrate 800 having the stop 820 thereon.

After the lens transparent polymer 830 is applied on the transparent substrate 800, the lens transparent polymer 830 is compressed from above by the first substrate 700 having the stamp mold 610 thereon, and then UV is irradiated from above the transparent substrate 800 to cure the lens transparent polymer 830 by TV embossing. Here, when the lens transparent polymer 830 on the transparent substrate 800 is compressed by the stamp mold 610 of the first substrate 700, optionally, a release agent may be sufficiently applied on an inner surface of the stamp mold 610 to prevent the stamp mold 610 from directly contacting the lens transparent polymer 830. This allows the stamp mold 610 from being easily separated from the lens transparent polymer 830.

Figure 4E:
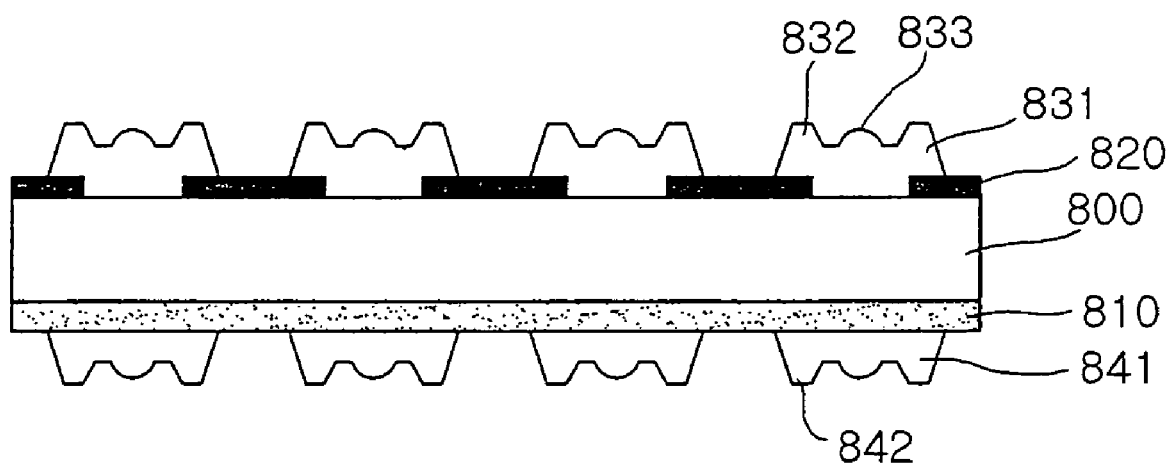

Therefore, when the lens transparent polymer 830 is compressed and cured by virtue of the stamp mold 610 and separated from each other, as shown in FIG. 4E, upper lenses can be replicated on the transparent substrate 800 according to an inner shape of the stamp mold 610. Each of the upper lenses includes a lens element 833 and an upper partition wall 832 formed higher than the lens element 833 to surround the lens element 833 and having a flat top surface.

Subsequently, other lens transparent polymer is applied on a bottom of the IR blocking filter 810, and then compressed by another stamp mold (not shown) similar to the stamp mold 610, cured and separated. This allows lower lenses 841 to be replicated corresponding to the upper lenses 831. Each of the lower lenses includes a lens element 843 and a lower partition wall 842 formed higher than the lens element 843 to surround the lens element and having a flat top surface.

When the lower lens 841 is replicated corresponding to the upper lens 831, the upper partition wall 832 can prevent the lens element of the upper lens 831 from being impaired during the compression process.

Moreover, as shown in FIG. 3, one of the lower lens element 453 and the upper lens element 452 may include an anti-reflective coating layer 455. The anti-reflective coating layer may be formed of one of a metallic material and an amorphous carbon-based organic anti-reflective coating material. Here, the metallic material is one selected from a group consisting of Ti, TiN, MoSi, SiNO, SiC, MoO3, Si3N4, AlGaAs, GaAs, CdSe and InP.

Figure 4F:
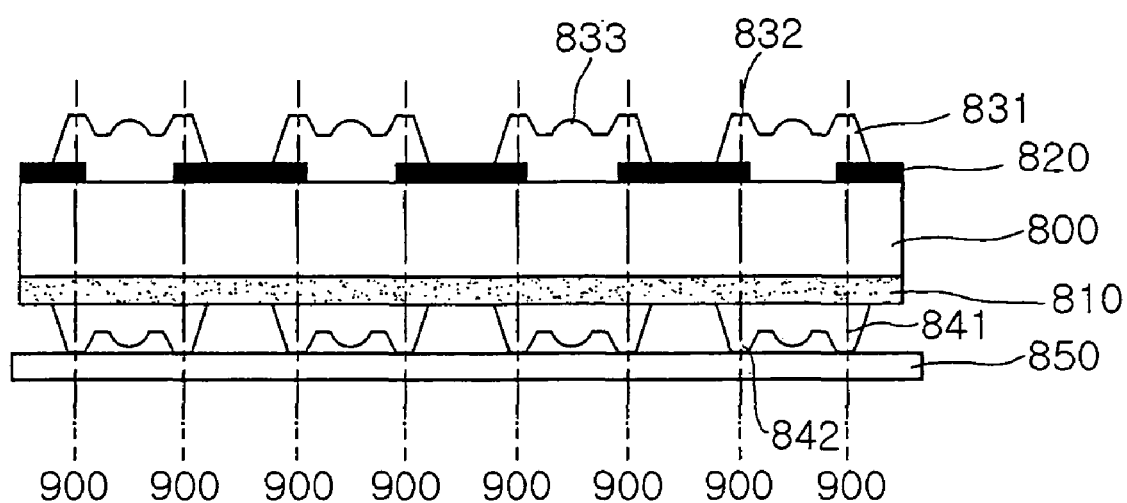

As described above, the transparent substrate 800 has the upper lenses 831 and the lower lenses 841 formed on the top and bottom thereof, respectively. Thereafter, as shown in FIG. 4F, a dicing tape 460 may be adhered to one of the upper partition wall 832 and the lower partition wall 842. The dicing tape 460 may be adhered to the lower partition wall 842 of the lower lens 841 as shown in FIG. 4F.

As shown in FIG. 4F, the upper partition wall 832 of the upper lens 831 and the lower partition wall 842 of the lower lens 841, respectively, are formed higher than a corresponding one of the upper and lower lens elements and have a flat top surface. This ensures the dicing tape 460 for the dicing process to be easily adhered.

Afterwards, with the dicing tape 460 adhered to the lower partition wall 842 of the lower lens 841, as shown in FIG. 4F, to separate the upper lens 831 and the lower lens 841 integrally with each other, dicing is performed along trimming lines 900 each passing through the upper and lower partition walls 832 and 842.

Here, when the dicing process is performed along the trimming lines 900, to prevent the lens elements from being damaged by a blade used, the respective top surfaces of the upper and lower partition walls 832 and 842 should have a width greater than a width of the blade.

Therefore, with the dicing performed along the trimming lines 900, as shown in FIG. 5, an imaging lens is produced. The imaging lens includes the upper lens 831 having the stop 820 and the upper partition wall 832 formed on the top of the transparent substrate 800, and the lower lens 841 having the IR blocking filter 810 and the lower partition wall 842 formed on the bottom of the transparent substrate 800.

As set forth above, according to exemplary embodiments of the invention, in a method of manufacturing an imaging lens of the present embodiment, a partition wall formed higher than the lens element and having a flat top surface is replicated together with the lens element on at least one surface of the transparent substrate. This partition wall prevents the previously replicated lens element from being deformed when another lens element is replicated on an opposite surface of the transparent substrate. Also, a dicing tape for a dicing process can be adhered to the partition wall regardless of the shape of the lens element, thereby facilitating the dicing process.

While the present invention has been shown and described in connection with the exemplary embodiments, it will be apparent to those skilled in the art that modifications and variations can be made without departing from the spirit and scope of the invention as defined by the appended claims.

What is claimed is:

1. An imaging lens comprising:
    a transparent substrate formed of glass and having an infrared blocking layer formed integrally on a top or a bottom thereof;
    an upper lens formed of a polymer and integrally formed on the top of the transparent substrate;
    a lower lens formed of a polymer and integrally formed on the bottom of the transparent substrate to correspond to the upper lens; and
    a partition wall protruded upwardly from the top of the transparent substrate to have a height higher than a height of the upper lens formed to surround the upper lens or protruded downwardly from the bottom of the transparent substrate to have a height higher than a height of the lower lens and surrounding the lower lens.

2. The imaging lens of claim 1, wherein the transparent substrate comprises a stop.

3. The imaging lens of claim 1, wherein the upper lens comprises an anti-reflective coating layer formed of one of a metallic material and an amorphous carbon-based organic anti-reflective coating material,
    wherein the metallic material comprises one selected from a group consisting of Ti, TiN, MoSi, SiNO, SiC, MoO$_3$, Si$_3$N$_4$, AlGaAs, GaAs, CdSe and InP.

4. The imaging lens of claim 1, wherein the lower lens comprises an anti-reflective coating layer formed of one of a metallic material and an amorphous carbon-based organic anti-reflective coating material,
    wherein the metallic material comprises one selected from a group consisting of Ti, TiN, MoSi, SiNO, SiC, MoO$_3$, Si$_3$N$_4$, AlGaAs, GaAs, CdSe and InP.

5. The imaging lens of claim 1, wherein the upper lens or the lower lens is formed of an aspherical lens having one of positive and negative refractive powers.

6. The imaging lens of claim 1, wherein the upper lens or the lower lens is formed of a diffractive lens having one of positive and negative refractive powers.

7. A method of manufacturing an imaging lens, the method comprising:
    forming an infra-red ray blocking layer integrally on a transparent glass substrate;
    integrally forming a plurality of upper lenses on the transparent substrate, the upper lenses each being formed of a polymer and having an upper lens element and an upper partition wall protruding upwardly from a top of the transparent substrate and having a height higher than a height of the upper lens element formed to surround the upper lens element;
    replicating a plurality of lower lenses on a bottom of the transparent substrate to correspond to the upper lenses, the lower lenses each being formed of a polymer; and
    dicing the transparent substrate along a trimming line passing through the upper partition wall.

8. The method of claim 7, wherein the forming a plurality of upper lenses on a transparent substrate comprises:
    forming a stamp on a first substrate to replicate the plurality of upper lenses, and
    forming the plurality of upper lenses on the transparent substrate using the stamp.

9. The method of claim 8, wherein the forming a stamp on a first substrate comprises:

forming a master by disposing a plurality of master molds on one surface of a base, the master molds each comprising a lens element mold and a partition wall mold protruded higher than the lens element mold to surround the lens element mold and having a flat top surface;

applying a polymer onto the base to cover the master molds; and forming a stamp having a plurality of stamp molds on the first substrate by compressing the polymer from above by the first substrate, curing and separating the polymer.

10. The method of claim 7, wherein in the replicating a plurality of lower lenses, the lower lenses each comprises a lower partition wall corresponding to the upper partition wall of each of the upper lenses.

11. The method of claim 10, wherein each of the upper and lower partition walls is formed higher than a corresponding one of the upper and lower lens elements to surround the corresponding lens element and has a flat top surface.

12. The method of claim 10, wherein the dicing the transparent substrate comprises:

adhering a dicing tape on one of the upper and lower partition walls.

13. The method of claim 7, wherein the forming a plurality of upper lenses on a transparent substrate comprises disposing a stop between the transparent substrate and the upper lenses.

14. The method of claim 7, wherein the forming a plurality of upper lenses on a transparent substrate comprises irradiating ultraviolet ray onto a lens transparent polymer for forming the upper lenses and curing the lens transparent polymer.

15. The method of claim 7, wherein the replicating a plurality of lower lenses comprises irradiating ultraviolet ray onto a lens transparent polymer for forming the lower lenses and curing the lens transparent polymer.

16. The method of claim 7, wherein the forming a plurality of upper lenses on a transparent substrate comprises forming an anti-reflective coating layer formed of one of a metallic material and an amorphous carbon-based organic anti-reflective coating material, wherein the metallic material comprises one selected from a group consisting of Ti, TiN, MoSi, SiNO, SiC, $MoO_3$, $Si_3N_4$, AlGaAs, GaAs, CdSe and InP.

17. The method of claim 7, wherein the replicating a plurality of lower lenses comprises forming an anti-reflective coating layer formed of one of a metallic material and an amorphous carbon-based organic anti-reflective coating material, wherein the metallic material comprises one selected from a group consisting of Ti, TiN, MoSi, SiNO, SiC, $MoO_3$, $Si_3N_4$, AlGaAs, GaAs, CdSe and InP.

* * * * *